(No Model.)

R. McD. SMITH.
CAR WHEEL.

No. 272,342. Patented Feb. 13, 1883.

Attest:
Geo. T. Smallwood Jr.
L. M. Hopkins.

Inventor:
Robert McD. Smith.
By Knight Bros.
attys

UNITED STATES PATENT OFFICE.

ROBERT McD. SMITH, OF ANNADA, ASSIGNOR OF ONE-HALF TO HENRY S. CARROLL, OF CLARKSVILLE, MISSOURI.

CAR-WHEEL.

SPECIFICATION forming part of Letters Patent No. 272,342, dated February 13, 1883.

Application filed February 14, 1882. (No model.)

*To all whom it may concern:*

Be it known that I, ROBERT McD. SMITH, a citizen of the United States, residing at Annada, in the county of Pike and State of Missouri, have invented a new and useful Improvement in Railway-Car Wheels, of which the following is a specification.

My invention relates to that class of car-wheels which are provided with supplementary treads and flanges for preventing the wheels from leaving the track when the normal tread-surfaces thereof pass off from the rails.

The invention consists in a car-wheel having a wide normal tread-surface, and a supplementary tread-surface or bead, made larger in diameter and narrower than the normal tread, and connected therewith by means of a perpendicular flange. The portion of the latter, where it joins the supplementary tread, is rounded or curved, so as to afford an easy transfer from one tread to the other without sudden jar or jolt.

In order that my invention may be fully understood, I will now proceed to describe it with reference to the accompanying drawings, in which—

Figure 1:
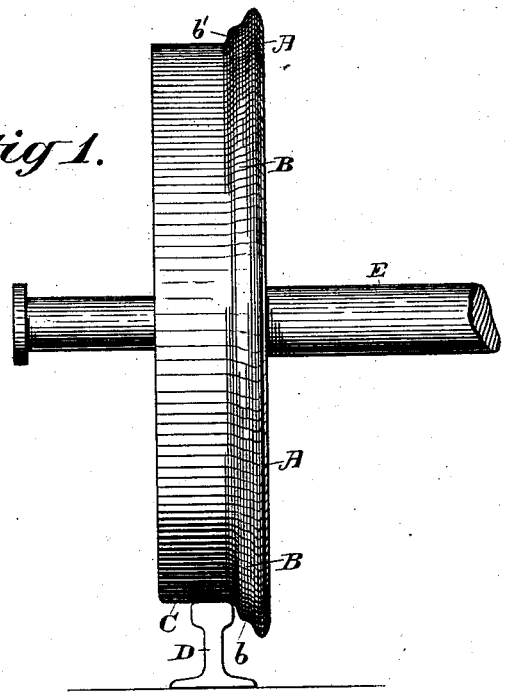
Figure 2:
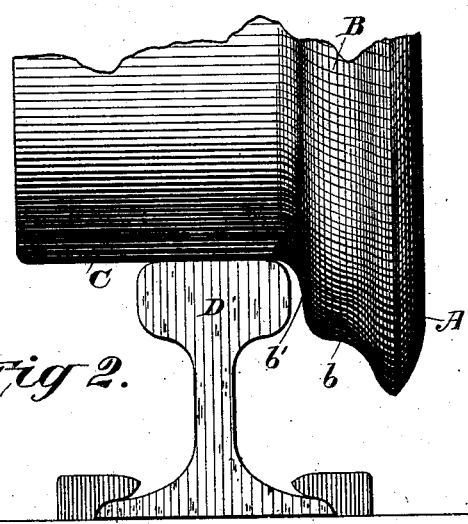

Figure 1 is a front elevation of a car-wheel in position on the rail; and Fig. 2, a similar elevation, showing a portion of the rim of the wheel on a larger scale.

The flange proper is shown at A, and is formed in the present preferred manner, with a double bevel coming to an angle at the periphery to adapt it to work to the best advantage in passing frogs, guard-rails, and the like.

The supplemental flange or bead is shown at B, and the ordinary working tread of the wheel at C.

D represents a T-rail of usual form, and E a portion of the axle, to which my improved wheel is applied in customary manner.

The wheel may be cast in one piece with a flange proper, A, tread C, and intermediate flange or bead, B. The said bead may have a face or tread surface, $b$, of from a quarter to three-quarters of an inch, as preferred, and a perpendicular wall at $b'$, adapted to work or bear against the inner edge of the head of the rail D, so as to retain the wheel securely in position, the angle formed by the tread $b$ and wall $b'$ being rounded to afford an easy transfer from one tread to the other. I also provide a tread-surface, C, of sufficient breadth to allow for a lateral movement or gain of either wheel from one side to the other without danger of displacement. The bead or supplemental flange B acts in the place of the common flange, except in case it jumps the rail, in which event the outer or proper flange, A, comes in operation as an additional guard or protector, saving the wheel from all danger of running off. Even in case the wheel may run for a time on the tread of the bead B no danger will ensue; but the wheel will infallibly resume its original position, with the tread C on the head of the rail, at the first diversion of the track from a straight line, or even without this, by reason of the lateral vibration of the car. It will be manifest that when the bead B passes onto the rail the diameter of the tread-surface is increased, and thus this wheel is caused to travel faster than the wheel at the opposite side of the car; but it will instantly resume its normal position when a straight portion of the track is reached.

I am aware that a car-wheel has heretofore been constructed with a conical tread-surface located between the customary flat tread-surface and outer guide-flange, the main object of this construction being to facilitate the turning of curves by permitting the wheel to have a lateral movement on the rail. A car-wheel constructed in this manner cannot, however, be used in connection with ordinary track-frogs and guard-rails, because it will be manifest that the location of the flange at the outside of the conical tread-surface will necessitate the placing of the frogs and guard-rails farther apart than is customary to permit the passage of ordinary wheels. A car-wheel having the guide-flange located at some distance from the ordinary flat tread-surface by reason of the intervening conical tread-surface will also permit the wheel to have a lateral movement whenever there is a slight change in the elevation of either rail, and otherwise cause an objectionable swaying from side to side when passing over a slightly-uneven track. These results are of course due to the fact that the flange of the wheel does not become a positive stop until the entire conical surface has passed onto the rail. In a wheel constructed according to my invention the secondary flange or bead serves as a positive stop by coming in contact with the crown or tread of the rail, thus causing the wheel to run in a smooth and steady manner. In the event of the wheel striking a flaw or split rail it will be safely carried over the same. When, however, the bead or secondary flange passes onto the rail the outer flange comes against the rail and saves the wheel from instant displacement, at the same time increasing the diameter of the tread-surface, and throwing it back into its normal position, either on a curve or straight track, as has already been set forth.

My improved wheel is adapted to work with perfect safety and success with frogs, switches, guard-rails, and track-connections at present in use, and hence a car with my improved safety-wheels can be run in a train with cars having wheels of ordinary form and construction without any inconvenience or difficulty.

Having thus described my invention, what I claim as new, and desire to secure by Letters Patent, is—

The car-wheel herein described, having the wide normal tread-surface C, the perpendicular flange $b'$, extending therefrom, and having a rounded or curved surface, the supplementary tread or bead $b$, connected with said rounded surface, and the outer flange, A, extending beyond the supplementary tread, as and for the purpose set forth.

R. McD. SMITH.

Witnesses:
JOHN C. WELLS,
ZACH. EASTIN.